United States Patent

[11] 3,617,323

| [72] | Inventor | Albert Riegler |
| --- | --- | --- |
| | | Basel, Switzerland |
| [21] | Appl. No. | 777,147 |
| [22] | Filed | Nov. 19, 1968 |
| [45] | Patented | Nov. 2, 1971 |
| [73] | Assignee | Ciba Limited |
| | | Basel, Switzerland |
| [32] | Priorities | Dec. 5, 1967 |
| [33] | | Switzerland |
| [31] | | 17104/67; |
| | | Oct. 4, 1968, Switzerland, No. 14835/68 |

[54] PIGMENT PREPARATIONS
7 Claims, No Drawings

[52] U.S. Cl................................................. 106/308 F,
106/288 B, 106/288 Q, 106/290, 106/300,
106/304, 106/305, 106/307, 106/308 N,
252/301.2 W
[51] Int. Cl...................................................... C09c,
C09c 1/00, C09c 3/00
[50] Field of Search........................................... 106/308 F,
308 N, 309; 252/301.2 W

[56] References Cited

UNITED STATES PATENTS

| 2,755,195 | 7/1956 | Grubenmann................ | 106/309 |
| --- | --- | --- | --- |
| 3,351,481 | 11/1967 | Hopmeier..................... | 106/309 X |

FOREIGN PATENTS

| 515,604 | 12/1939 | Great Britain................ | 106/308 F |
| --- | --- | --- | --- |
| 784,662 | 10/1957 | Great Britain................ | 106/309 |

*Primary Examiner*—Tobias E. Levow
*Assistant Examiner*—H. M. S. Sneed
*Attorneys*—Harry Goldsmith, Joseph G. Kolodny, Bryant W. Brennan and Edward J. Sites ABSTRACT: Preparations which contain a pigment and/or an optical brightener and a salt of an aliphatic carboxylic acid containing at least six carbon atoms and a metal of Group 2 or 3 of the Periodic Table and no more than 10 percent (referred to the weight of the metal salt) of an amide or ester of a lower alkanolamine with a fatty acid containing a lipophilic residue of at least 10 carbon atoms, are useful for pigmenting high-melting thermoplastic compositions.

PIGMENT PREPARATIONS

A wide variety of substrata are advantageously colored with pigments, namely dyestuffs that are insoluble or for practical purposes insoluble not only in water but also in various organic solvents, so as to prevent subsequent migration as well as bleeding of the dyestuffs. It is often difficult, however, to distribute a pigment powder finely and uniformly in a particular substratum. To overcome this difficulty pigment preparations are used in which a pigment in concentrated form is distributed in a suitable vehicle. Such pigment preparations must, of course, satisfy several demands if the purposes for which they are required are to be fulfilled. Thus, for example, the pigment must already be well and evenly distributed in the preparation and the vehicle in the preparation must be suitable for the final produce required, that is to say it must be compatible with the substratum to be colored and must be easy to incorporate with it.

The present invention is based on the unexpected observation that preparations containing a pigment and/or an optical brightener and a salt of a saturated or unsaturated aliphatic carboxylic acid containing at least six carbon atoms and a metal of Group 2 or 3 of the Periodic Table, and, if desired, also containing up to 10 percent (referred to the weight of the metal salt of the carboxylic acid) of an amide or ester of a lower alkanolamine with a fatty acid containing a lipophilic residue of at least 10 carbon atoms, lend themselves extremely well to the pigmentation of thermoplastic compositions.

Pigments suitable for use in the preparations of this invention are, for example, inorganic pigments, for example soot, metal powders, titanium dioxide, iron hydroxides, iron oxides, ultramarine, and especially organic pigments, for example those belonging to the azo, anthraquinone, phthalocyanine, nitro, perinone, perylene tetracarboxylic acid diimide, dioxazine, thioindigo or quinacridone dyestuff series, and also optical brighteners. Mixtures of different pigments and/or brighteners are also suitable.

The cations of the metal salts to be used in the present invention are primarily the metals of the alkaline earth and earth metal series, for example calcium, barium, zinc, aluminum and especially magnesium.

The anions of the salts are preferably derived from carboxylic acids containing 12 to 30, preferably 16 to 24 carbon atoms. The aliphatic hydrocarbon chains of the acid residues may be interrupted by bridge members, for example oxygen or sulfur atoms, or by aromatic residues; they may also contain branched carbon chains. As relevant examples the following carboxylic acids may be mentioned: Caproic, ethyl-caproic, caprylic, capric, lauric, myristic, palmitic, stearic, arachic, behenic, lignoceric, cerotic, xylylstearic, montanic, decylic, dodecylic, hexadecylic, octadecyl-glycollic and -thio-glycollic acids, the octyl- or nonyl-phenoxyacetic acids or phenylstearic acid. Also suitable are the salts of substituted fatty acids, for example of 12-oxystearic acid or of ω-amino-undecanoic acid, or of unsaturated fatty acids, for example of undecylenic, oleic, linoleic, elaidic or ricinoleic acid. Mixtures of salts of different acid residues or cations may, of course, be used.

The ratio pigment to metal soap is advantageously chosen so that the finished preparation contains 25 to 75 percent of pigment. Particularly good results have been achieved with preparations containing 40 to 60 percent of pigment.

Apart from the components to be used according to this invention the preparations may contain further additives, for example stabilizers or fillers, for instance up to 10 percent (referred to the weight of the metal soaps) of amides or esters of lower alkanolamines with fatty acids containing a lipophilic residue of at least 10 carbon atoms.

In general, however, such additives are superfluous and may in some cases even have a detrimental effect, for example in pigmenting high-melting thermoplastic compositions, for example linear polyesters or polyamides.

To obtain the pigment preparations the ingredients are intimately mixed, for example by grinding in the presence of a liquid, advantageously a water-soluble organic solvent, for example methanol, ethanol, isopropanol or acetone.

As desired, either ball mills or roller mills may be used, though it is advantageous to use mills in which a filling of glass balls, porcelain balls or similar balls, or a filling of hard gravel or the like is kept moving by means of a suitable agitator. A feature common to all such disintegrating devices is the fact that the grinding bodies are relatively freely movable and are capable of performing both frictional and percussive movements.

On completion of the grinding operation the solvent is advantageously removed by means of steam.

The preparations of this invention may also be manufactured in a kneader. Processing is preferably carried out at an elevated temperature in the presence of a grinding assistant, advantageously of an inorganic salt, for instance sodium chloride, potassium chloride, sodium sulfate or barium chloride. These salts are easy to wash out again with water. Moreover, it is advantageous to use an organic solvent, preferably an organic solvent that is at least partially water miscible, for example diethyleneglycol diethyl ether or especially benzyl alcohol. On completion of the kneading operation the dough is advantageously treated with water to free it from salts and solvents.

The pigment preparations of this invention can also be obtained by the so-called flush process according to which an aqueous pigment paste is kneaded with a fatty acid containing 10 to 22 carbon atoms at an elevated temperature, advantageously from 50° to 150° C. The water released during this kneading is advantageously drained off and the dough is further kneaded with a hydroxide or alcoholate of an alkali, alkaline earth or earth metal, preferably magnesium or aluminum hydroxide, or sodium ethylate or aluminum isopropylate, while removing the released water, until a homogeneous preparation is obtained. As a rule it is advantageous to triturate the resulting preparation to a particle size appropriate to its application in thermoplastic compositions.

In this form the preparations are easy to incorporate with the compositions to be pigmented, for example, with polymerization resins for example polyvinylchloride, polyolefines for example polyethylene, polypropylene, polybutadiene, polyisoprene, polystyrene or copolymers of the corresponding monomers. The preparations of this invention are also specially suitable for use in high-melting thermoplastic compositions, for example linear polyesters, especially polyethylene terephthalate, polyamides for example those from hexamethylenediamine adipate, ε-caprolactam or ω-aminoundecanoic acid.

They are distinguished by excellent dispersibility and tinctorial strength and yield in the said thermoplastic compositions level and pure shades.

Unless otherwise indicated, parts and percentages in the following examples are by weight.

EXAMPLE 1

30 Parts of β-copper phthalocyanine and 30 parts of powdered magnesium stearate in isopropanol are finely ground in a sand mill. The resulting suspension is evaporated. The soft, granular residue contains 50 percent of pigment; it is ground to a fine powder and may be used, for example, for pigmenting nylon.

When calcium or aluminum stearate is used instead of magnesium stearate, preparations having similar properties are obtained.

Example of Use

98 Parts of a polyamide of ε-caprolactam (polyamide 6) in chip form are coated with 2 parts of the pigment preparation obtained according to the description in the first paragraph in dry form. The coated chips are spun at 290°–295° C. in an extruder. The resulting filament displays a level deep blue shade having considerable fastness to light and wetting.

EXAMPLE 2

164.0 Parts of an aqueous β-copper phthalocyanine paste (containing 36.6 percent of pigment) and 57.8 parts of stearic acid are kneaded for a quarter of an hour at 60 °C. The water released is decanted. 5.9 Parts of magnesium hydroxide are added and the whole is further kneaded at 120° C. The released water is evaporated. When a homogeneous mixture has formed, the resulting brittle product is ground to form a finely pulverulent, blue pigment preparation containing 50 percent of pigment. It may be used, for example, for pigmenting polypropylene, nylon, hard polyvinylchloride or polystyrene.

When flavanthrone is used instead of β-copper phthalocyanine, a yellow preparation is obtained which may be used, for example, for pigmenting polypropylene.

Example of Use

99 Parts of isotactic polypropylene in the form of chips are coated with 1 part of the preparation according to paragraph 1 in the dry form. The coated chips are melted at 180° to 220° C. and extruded through a nozzle. A blue polypropylene tape is obtained which can be granulated after cooling, and the resulting granulate may be used for injection molding.

EXAMPLE 3

A mixture of 30 parts of highly chlorinated copper pthalocyanine, 30 parts of zinc behenate and 60 parts of finely ground sodium chloride is worked at 130° C. in a kneader. When a homogeneous mixture has formed, the product is ground with water, filtered, washed free from salts, dried and powdered, to provide a finely pulverulent preparation containing 50 percent of pigment which may be used, for example, for pigmenting polyamide 6.

When magnesium-12-oxystearate or magnesium montanate is used instead of zinc behenate, preparations having similar properties are obtained.

EXAMPLE 4

200 Part of the red pigment dyestuff of the formula

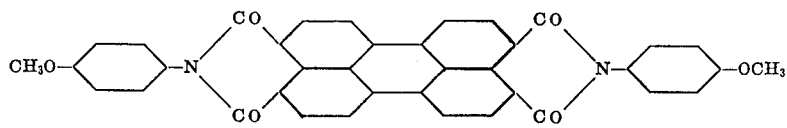

200 parts of magnesium behenate and 1,000 parts of finely ground sodium chloride are intimately mixed in a Lodige powder mixer. This mixture is worked in a continuously operating laboratory-type kneader at 130° C. The resulting granulate is ground with water, filtered, washed free from salt, dried and powdered. A finely pulverulent preparation containing 50 percent of pigment is obtained which may be used, for example, for pigmenting polyethylene terephthalate or polyamide 6.

When the red azo dyestuff of the formula

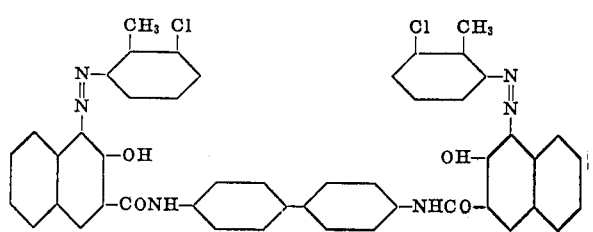

is used and proceeding otherwise as described in the first paragraph above, a finely pulverulent preparation containing 50 percent of pigment is also obtained. This may be used, for example, for pigmenting polyethylene or polypropylene.

Example of Use

A mixture of 1 part of the dyestuff preparation described in the second paragraph above and 99 parts of polyethylene is worked to and fro between the rolls of a calender for 10 minutes at 140°–170° C.; a red foil is obtained which has excellent fastness to light and migration. The foils may be granulated and the granulates used for injection molding or for blow molding foils.

When in the process described in the first paragraph above a mixture of 160 parts of lampblack 240 parts of magnesium behenate and 480 parts of finely ground sodium chloride is used, a finely pulverulent black preparation containing 40 percent of pigment is obtained which may be used, for example, for dyeing polyethylene terephthalate or nylon.

Example of Application

98 Parts of polyethylene terephthalate chips are coated with 2 parts of the pigment preparation obtained as described in the first paragraph above in the dry form. The coated chips are then melted in known manner at about 285° C. and spun to form fibers. The resulting fibers display a level red shade which is very fast to light and wetting.

EXAMPLE 5

700 Parts of titanium dioxide (rutile modification) and 300 parts of magnesium behenate are intimately mixed in a Lodige powder mixer, and this mixture is then worked at 95° C. in a continuously operating laboratory-type kneader (List system). The resulting granulates are finely ground and this fine powder may be used, for example, for pigmenting nylon.

When, instead of titanium dioxide, the optical brightener of the formula

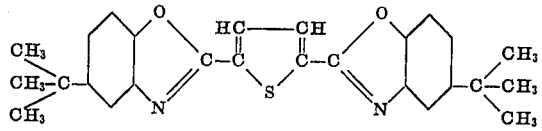

is used, a finely pulverulent preparation containing 70 percent of brightener is obtained which may be used, for example, for brightening nylon.

EXAMPLE 6

A mixture of 86.7 parts of an aqueous β-copper phthalocyanine paste (containing 34.6 percent of pigment) and 28.9 parts of erucic acid is worked in a kneader for a quarter of an hour at 60° C. The released water is decanted, 2.5 parts of magnesium hydroxide and 60 parts of finely ground sodium chloride are added and the whole is further kneaded at 120° C. The released water is evaporated, when a homogeneous mixture has formed, the resulting produce is ground with water, filtered, washed free from salt and powdered. A finely pulverulent blue preparation containing 50 percent of pigment is obtained which may be used, for example, for pigmenting polyamide 6.

EXAMPLE 7

A dry mixture of 22.5 parts of magnesium behenate and 2.5 parts of coconut fatty acid ethanolamide is ground in a porcelain ball mill. 25 Parts of β-copper phthalocyanine are then added and incorporated while continuing the grinding. A blue powder containing 50 percent of pigment is obtained which may be used, for example, for pigmenting polyamide 6.

I claim:

1. A preparation which contains 25 percent to 75 percent of a pigment and/or optical brightener and 75 percent to 25 percent of a metal salt of an aliphatic carboxylic acid containing at least six carbon atoms, said metal being an alkaline earth metal, aluminum or zinc and no more than 10 percent (referred to the weight of the metal salt) of an amide or ester of a lower alkanolamine with a fatty acid containing a lipophilic residue of at least 10 carbon atoms.

2. A preparation as claimed in claim 1, which contains an alkaline earth metal salt.

3. A preparation as claimed in claim 2, which contains a magnesium salt.

4. A preparation as claimed in claim 1, which contains a salt of a carboxylic acid containing 12 to 30 carbon atoms.

5. A preparation as claimed in claim 4, which contains a salt of a carboxylic acid containing 16 to 24 carbon atoms.

6. A preparation as claimed in claim 5, which contains a salt of behenic acid.

7. A preparation according to claim 1, containing 40 to 60 percent of pigment and/or optical brightener.